Jan. 19, 1943.　　　　　C. M. EASON　　　　　2,308,679
CLUTCH
Filed June 19, 1939　　　　8 Sheets-Sheet 2

Inventor:
Clarence M. Eason
By Brown, Jackson, Boettcher + Dienner
Attys

Jan. 19, 1943.     C. M. EASON     2,308,679
CLUTCH
Filed June 19, 1939     8 Sheets-Sheet 3
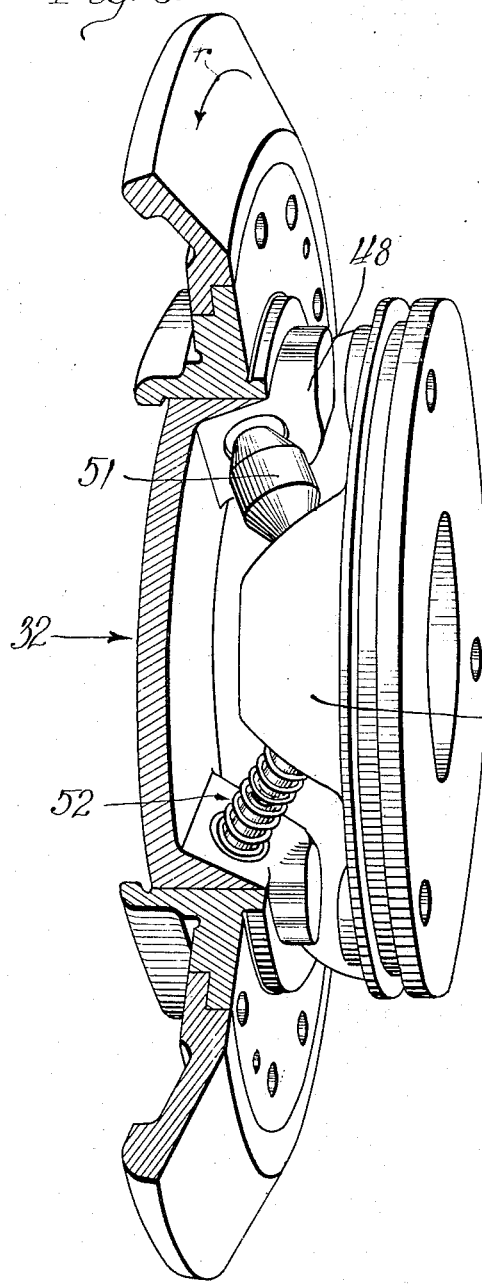
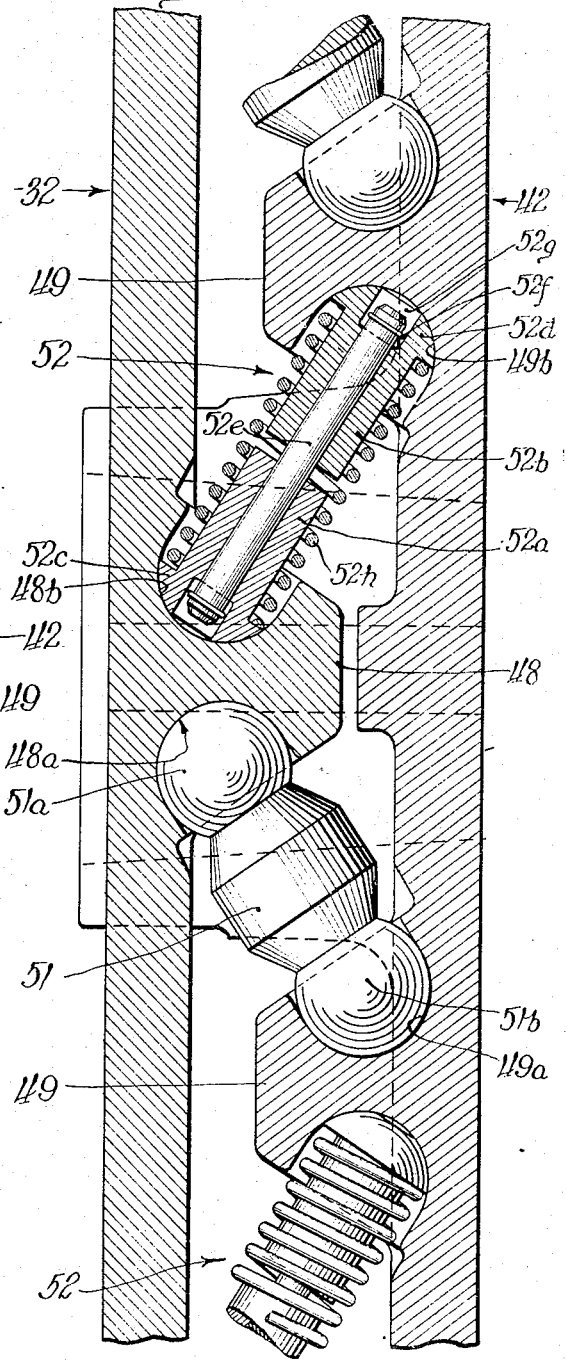
Inventor:
Clarence M. Eason
By Brown, Jackson, Boettcher & Dienner
Attys Jan. 19, 1943.  C. M. EASON  2,308,679
CLUTCH
Filed June 19, 1939   8 Sheets-Sheet 4
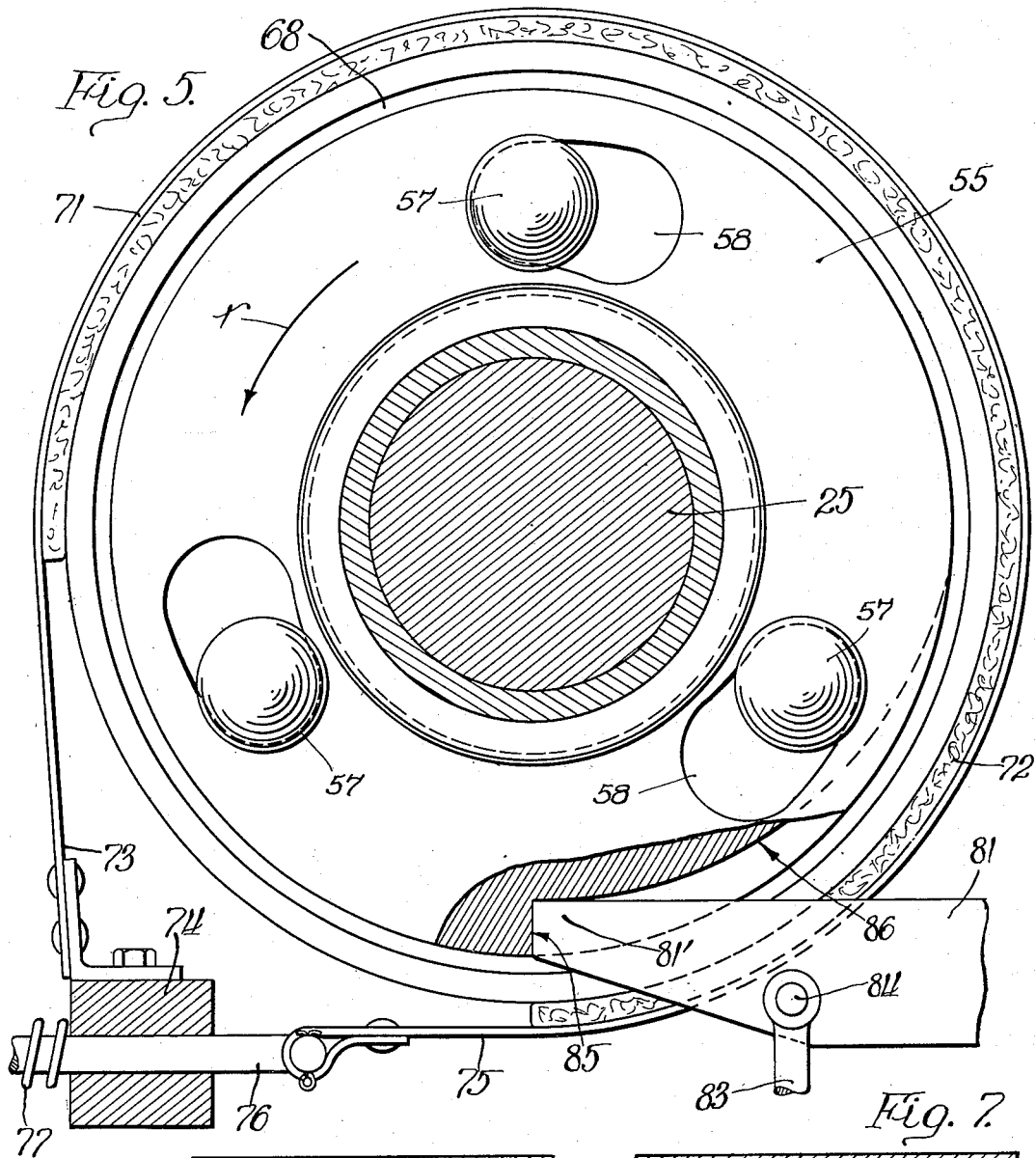
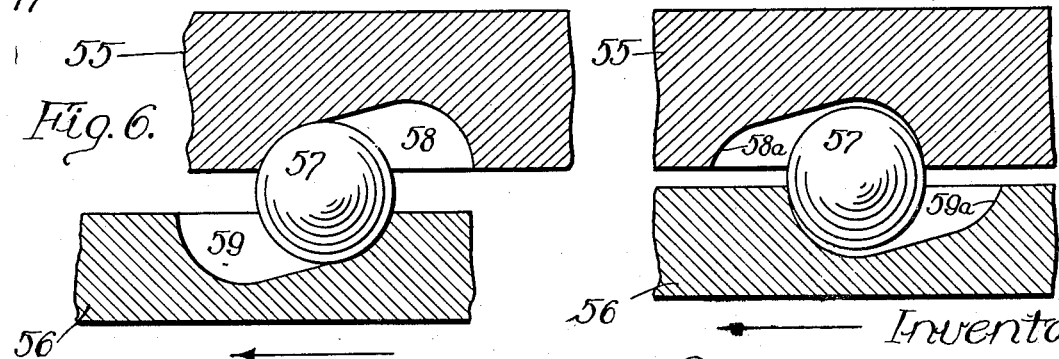
Inventor:
Clarence M. Eason
By Brown, Jackson, Boettcher & Dienner
Attys

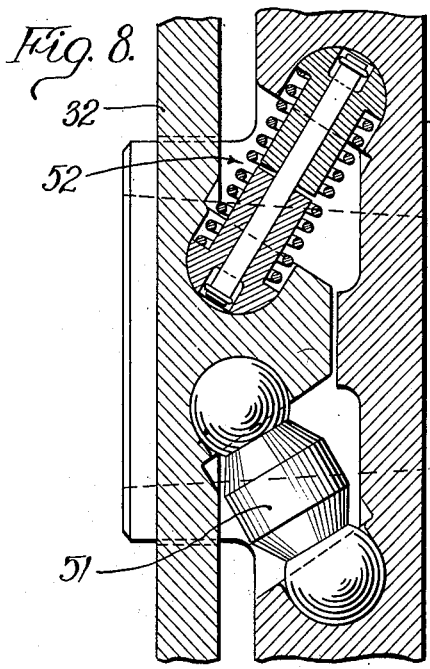
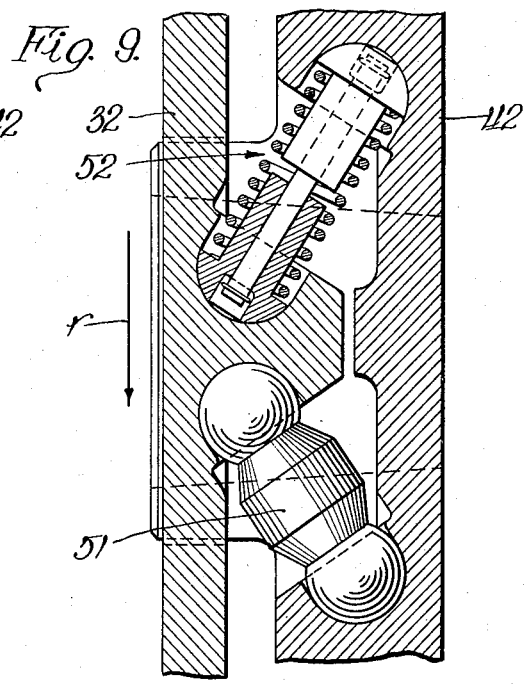
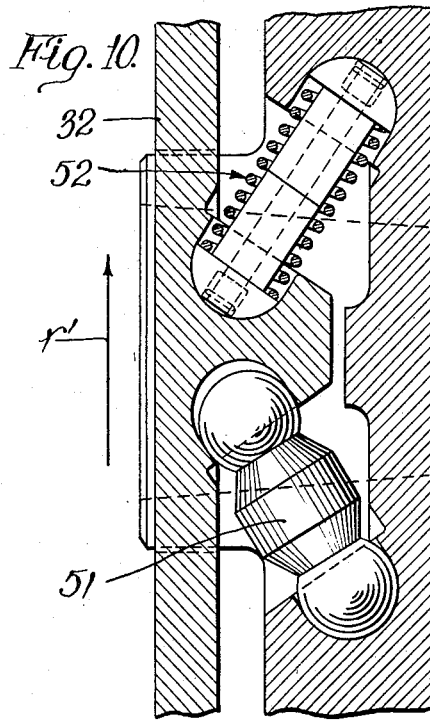
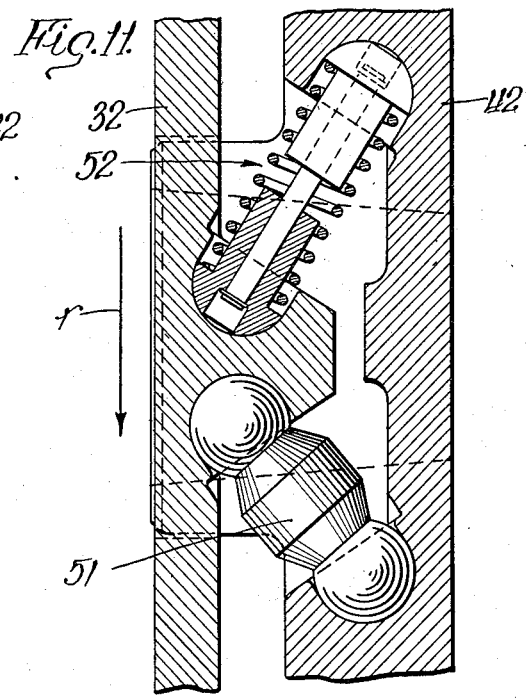

Jan. 19, 1943. C. M. EASON 2,308,679
CLUTCH
Filed June 19, 1939   8 Sheets-Sheet 6

Inventor:
Clarence M. Eason
By Brown, Jackson, Boettcher + Dienner.
Attys.

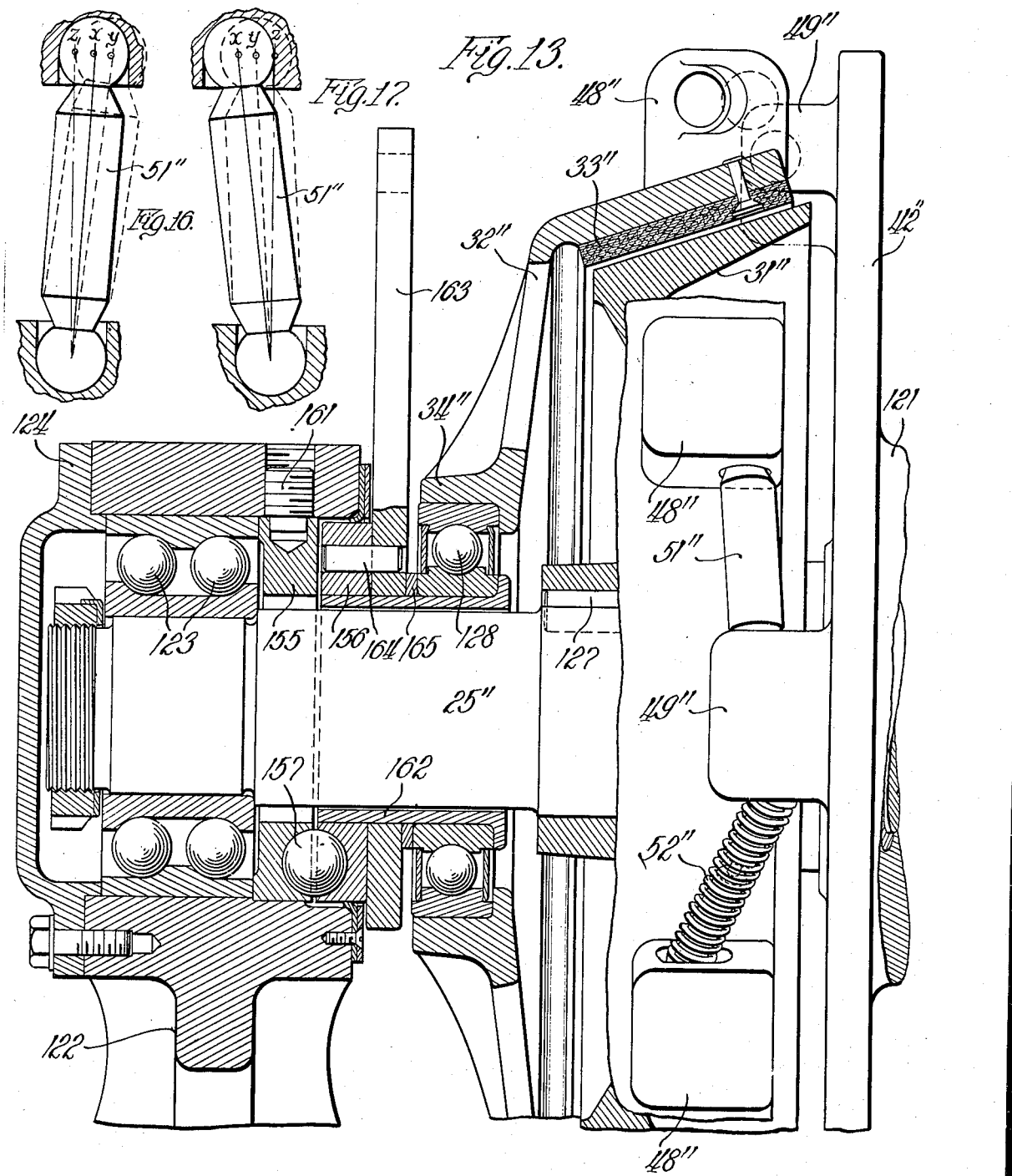

Jan. 19, 1943.     C. M. EASON     2,308,679
CLUTCH
Filed June 19, 1939     8 Sheets-Sheet 8
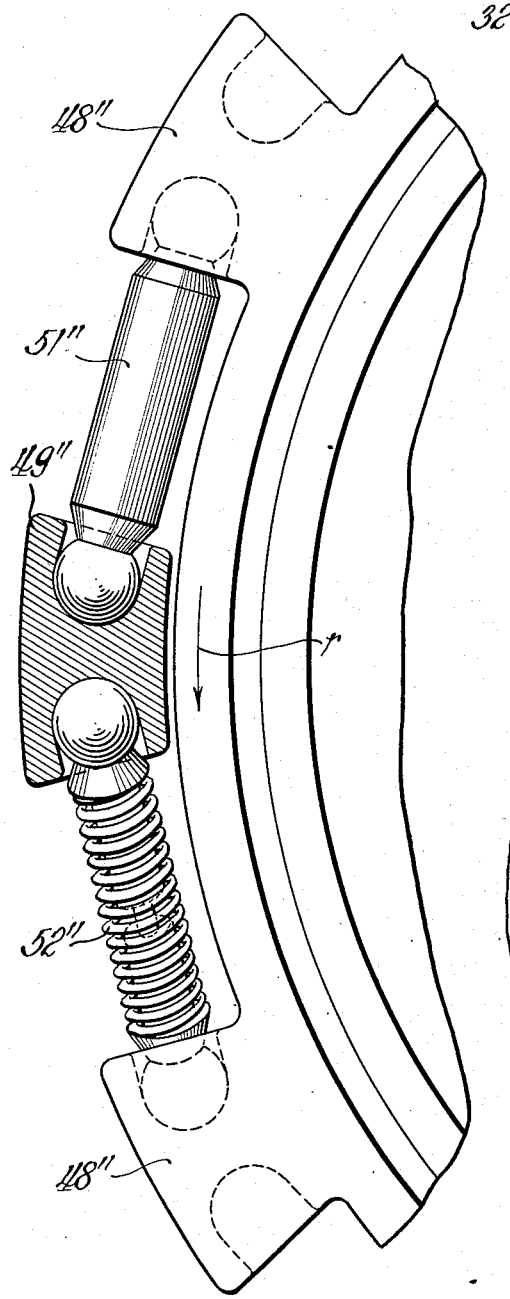
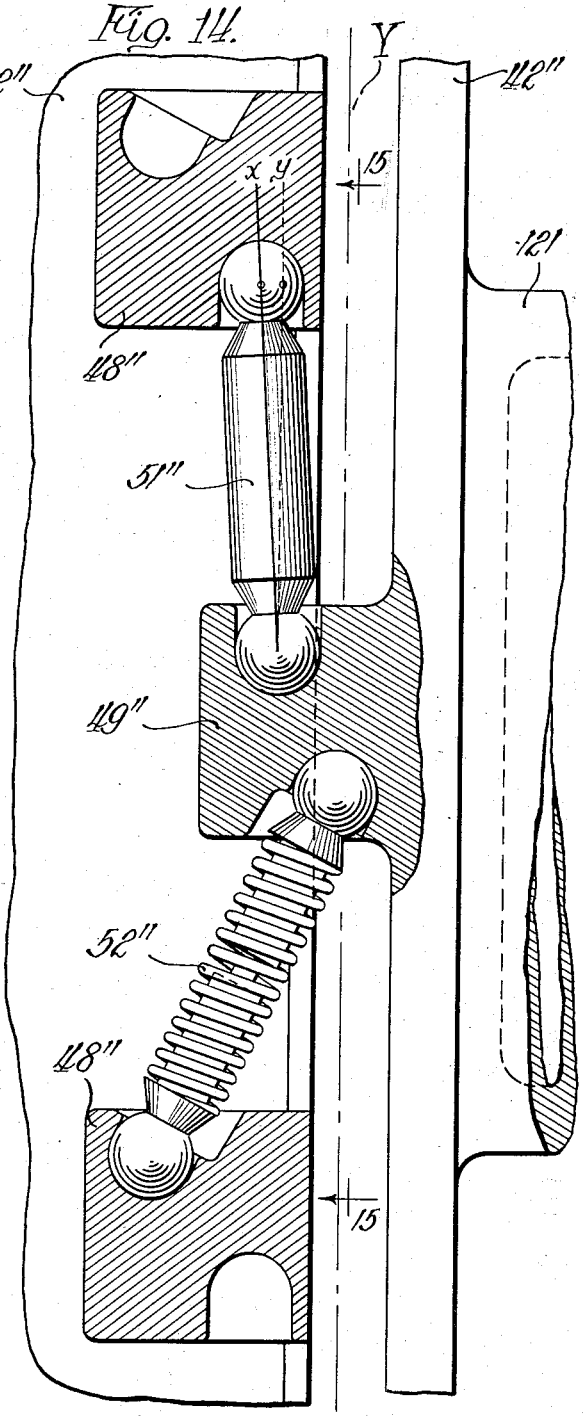
Inventor:
Clarence M. Eason
By Brown, Jackson, Boettcher & Drenner
Attys Patented Jan. 19, 1943

2,308,679

UNITED STATES PATENT OFFICE 2,308,679

CLUTCH

Clarence M. Eason, Waukesha, Wis.

Application June 19, 1939, Serial No. 279,899

40 Claims. (Cl. 192—24)

The present invention relates to clutches, and has particular reference to friction clutches embodying improved servo-mechanism for creating high engaging pressures between the friction surfaces of the clutch. The improved servo mechanism utilizes inclined servo struts or toggle struts to create these high engaging pressures. While the creation of a positive servo thrust acting in the clutch engaging direction is the principal utility of my improved arrangement of inclined struts, nevertheless they can also be employed to create a negative servo thrust acting in the clutch releasing direction, and can be still further employed in the primary capacity of minimizing friction between relatively shiftable elements of the clutch assembly, as will later appear.

I have developed my improved clutch mechanism primarily for use on punch presses, particularly of the heavy duty type. It has long been recognized that a friction clutch possesses definite operating advantages over a jaw or pin clutch for punch press use, particularly from the standpoint of reduced shock at time of engagement, reduced wear of clutch surfaces, etc. However, the likelihood of an objectionable amount of slippage in the friction clutch, together with the problems of control, have militated against the successful use of practically all prior friction clutches in these heavy duty, intermittently operating punch presses.

In my co-pending application, Serial No. 185,679, filed January 19, 1938, and issued as Patent No. 2,268,578 on Jan. 6, 1942, I have illustrated an earlier attack on the problem. In the improved friction clutch therein disclosed, I provide servo mechanism which utilizes helical splines for creating heavy engaging pressures between the clutch surfaces. The entire torque load of the press is transmitted through these helical splines, which react to exert a heavy engaging pressure between the clutch surfaces, this pressure increasing with increased torque load, and reaching a maximum at the instant of impact of the movable die with the work. The friction clutch illustrated in said earlier application is a cone type of clutch, which is ordinarily preferable because it can carry higher torques than other friction clutches; and the present application likewise illustrates a cone type of clutch for substantially the same reason, but it is to be understood that the invention can also be embodied in the disk type of friction clutch and in other friction clutches generally.

In the construction herein disclosed, the servo action is obtained by the use of inclined servo struts or toggle struts which are interposed between the shiftable clutch element and a coacting thrust reaction member which is arranged in torque transmitting relation to said shiftable clutch element. These struts consist of relatively short links or bars having spherical ends which are adapted to have seating engagement in spherical sockets formed in the shiftable clutch element and in the coacting thrust reaction member respectively. Where the struts are intended to create a positive servo thrust acting in the direction of clutch engagement, they are disposed in an angular relation to the plane of rotation such that torque transmitted through the struts tends to increase their angulation, thereby exerting a toggle spreading force between the shiftable clutch element and its coacting thrust reaction member for producing the desired positive servo action of forcing the shiftable clutch element into a higher pressure of engagement with the other clutch element.

In my improved construction herein disclosed, the struts are arranged to carry the entire torque load transmitted through the clutch at all times. This affords adequate operating energy for any positive or negative servo action that may be desired. It also results in a very simple construction, and one that has a reliable, definite operation at all times, such being particularly important in punch press use.

My improved construction also embodies a unique relation of oppositely disposed toggle struts which are capable of effecting servo action in either direction of rotation of the clutch. Thus, assuming a positive or clutch-engaging type of servo action to be desired, a forward driving set of toggle struts will produce such servo action in the forward direction of rotation, and a rearward driving set of toggle struts will produce substantially the same servo action in the rearward direction of rotation.

My improved construction further embodies a unique arrangement of spring struts for spring-loading the clutch. These spring struts may be of the same general design as the other struts except that they are extensible and contractible, as by making them of separate front and rear sections which can slide endwise relatively to each other. Springs mounted on these struts tend to elongate or extend the struts endwise, and such spring pressure is transmitted from the struts to the shiftable clutch element. Thus, in a clutch which is spring loaded to engage, these spring struts tend to force the shiftable clutch element into engagement with the other clutch element. In practice, I find that these spring struts can also be made to function in the capacity of rearward driving struts as well, whereby to create a servo action during reverse rotation and thereby assume the function or duty of the rearward driving set of toggle struts referred to above. That is to say, the same set of struts can be made to perform both duties, that of the spring struts and that of the rearward driving struts.

I have also disclosed improved operating mechanism for a clutch of the above general description. Still other forms of improved operating mechanisms for this type of clutch are disclosed in my copending application, Serial No. 282,588, filed July 3, 1939.

Other features, objects and advantages of the invention will appear from the following detail description of several preferred embodiments of the invention. In the accompanying drawings illustrating such embodiments:

Figure 3 is a perspective view, broken away in section, of the shiftable clutch element and its coacting reaction member, and illustrating a typical relation of forward drive servo struts and reverse drive spring struts;

Figure 4 is a detail sectional view showing one of these forward drive servo struts and one of the reverse drive spring struts;

Figure 5 is a transverse sectional view through the clutch operating mechanism, corresponding to a section taken approximately on the plane of the line 5—5 of Figure 1;

Figures 6 and 7 are detail sectional views showing different positions of the ball-cam parts of the clutch operating mechanism;

Figures 8, 9, 10 and 11 are detail sectional views showing different relations of the coacting struts corresponding to different positions of the clutch, different directions of rotation, etc.;

Figure 13 is a similar sectional view through still another embodiment thereof, this view illustrating a portion of the clutch periphery in elevation;

Figure 14 is an enlarged sectional view of that portion of the structure illustrated in elevation in Figure 13;

Figure 15 is a fragmentary transverse sectional view thereof, corresponding to a section taken approximately on the plane of the line 15—15 of Figure 14; and Figures 16 and 17 diagrammatically illustrate positive and negative servo actions of the driving struts employed in Figures 13 to 15 inclusive.

Figure 1:
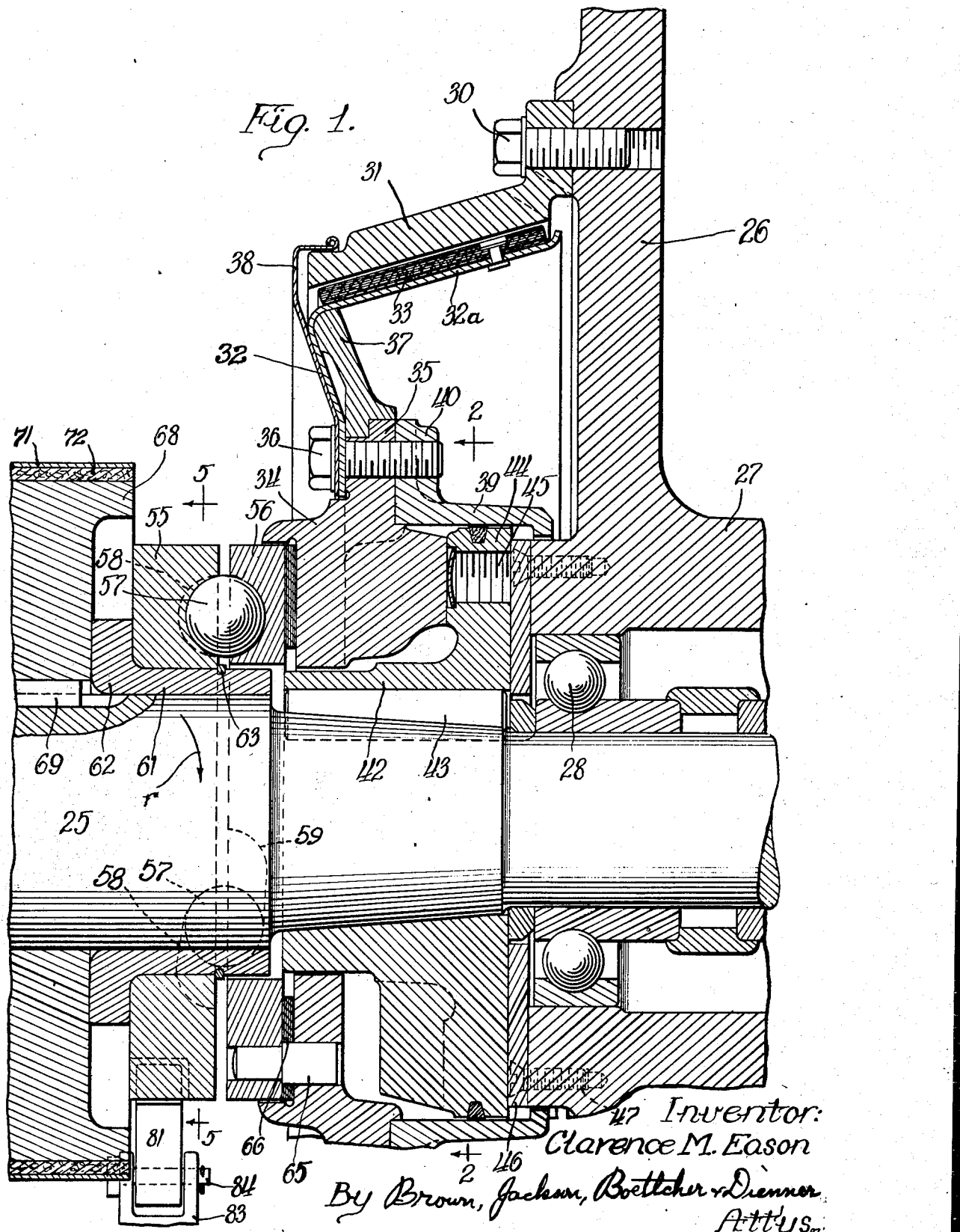
Figure 1 is a fragmentary axial sectional view through one embodiment of my improved clutch.

Referring first to the embodiment illustrated in Figures 1 to 7, inclusive, the crank shaft of the punch press is indicated at 25 in Figure 1, and the web portion of the fly wheel, bull-gear, or other driving element is indicated at 26. The hub portion 27 of said fly wheel is journaled on the reduced outer end of the crank shaft 25 through the medium of thrust resisting anti-friction bearings 28. The driving element of the clutch consists of a female cone 31 which is bolted to the web portion by the cap screws 30. The driven element of the clutch comprises a coacting male cone 32a, this being shiftable axially for effecting clutch engagement with the non-shiftable driving cone 31. The cone 32a is one part of an assembly which makes up the shiftable clutch element, and which I have designated 32 in its entirety. A renewable clutch lining 33 is secured to one of the clutch elements, preferably to the shiftable driven element 32. The shiftable clutch element also comprises a central hub structure 34 having a radially extending flange 35 to which is secured the central portion of the driven cone 32a by the cap screws 36 passing through the web portion of said cone and through said flange. Where the shiftable cone 32a is constructed of sheet metal, as shown, a reinforcing or backing plate 37 may be mounted on the flange 35 to reinforce the bend at the juncture of the cone portion and the web portion. That portion of the cone extending inwardly beyond said reinforced bend has an appreciable resiliency for easing the engagement of the clutch, accommodating eccentricity or misalignment, etc. If desired, this sheet metal cone portion may be slotted longitudinally; or the cone portion and the clutch lining secured thereto may be divided into segmental portions so as to facilitate removal of the cone sections when it is desired to renew the clutch lining. One typical construction of this nature is disclosed in my prior Patent No. 2,127,720, issued August 23, 1938. Also secured to the shiftable clutch element is a sheet metal guard ring 38 which overlies the outer clutch element 31 and prevents the entrance of lubricant and foreign matter to the clutch surfaces. The shiftable clutch element also includes a laterally projecting enclosing ring 39 which partially houses the several struts, and which has a radially extending flange 40 abutting the flange 35 and secured thereto by the cap screws 36.

Embraced within the hub structure 34 and housing ring 39 is the thrust reaction member 42 which receives the thrust reaction of the toggle struts and establishes the torque transmitting connection between the shiftable clutch element and the crankshaft 25. Said member 42 is rigidly anchored to the shaft 25 by a drive key 43 and by a tight fit on a tapered portion of said shaft, although it will be understood that a splined connection may be employed in lieu thereof, if desired. The radially extending flange 44 at the outer end of the member 42 has tapped holes 45 therein for establishing connection with a pulling tool, by which the member 42 can be easily released from its mounting on the tapered portion of the shaft 25. The outer face of the flange 44 abuts against a thrust ring 46 which is secured to the hub 27 of the driving element 26 by the screws 47. Thus, the thrust reaction incident to the axial movement of the shiftable clutch element 32 into engagement with the non-shiftable clutch element 31 is transmitted back through the thrust plate 46 and through the hub 27 and web portion 26 to the non-shiftable clutch element 31. The forces set up in the operation of releasing the clutch are transmitted through the thrust plate 46, hub 27, and thrust bearing or bearings 28 to the shaft 25.

Figure 2:
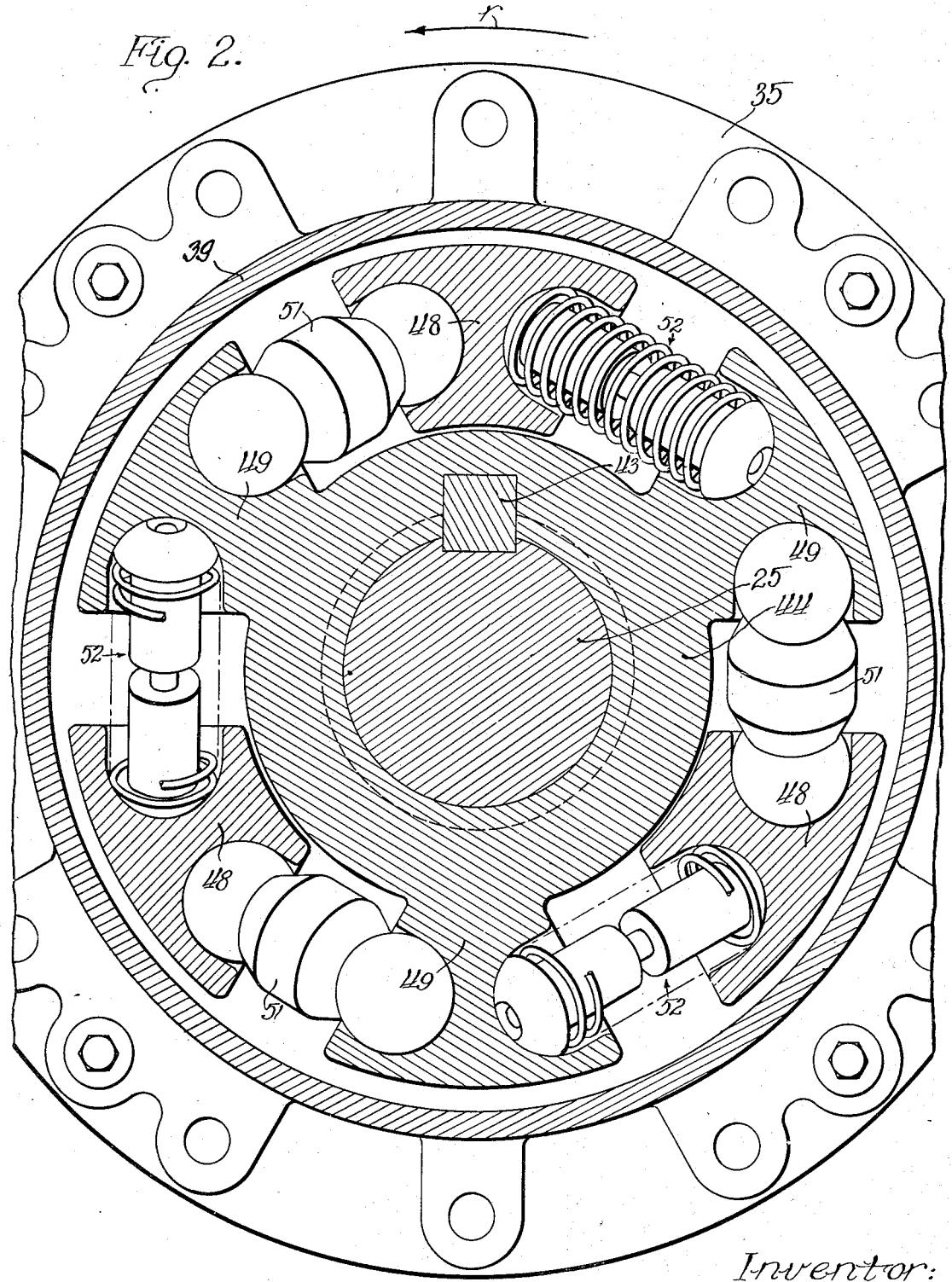
Figure 2 is a fragmentary transverse sectional view taken approximately on the plane of the line 2—2 of Figure 1, this view being on a slightly larger scale than Figure 1.

Referring now to Figures 2, 3, and 4, which illustrate how the driving and spring struts are interposed between the shiftable clutch member 32 and the thrust reaction member 42, it will be seen that the shiftable member 32 is formed with a plurality of lugs or bosses 48 which project laterally toward the right, and that the thrust reaction member 42 is formed with a plurality of lugs or bosses 49 which project laterally toward the left, the lugs or bosses of one member alternating or extending into the spaces between the lugs or bosses of the other member around the peripheries of the members. Interposed between these alternating bosses are the driving toggle struts 51 and the spring toggle struts 52. The forward driving struts 51 are solid, fixed-length steel units somewhat resembling dumb-bells, the spherical end heads 51a and 51b being relatively large and being accurately machined and ground for sustaining high compressive thrust loads through these spherical end heads with minimum friction. These spherical end heads 51a and 51b engage respectively within the spherical sockets 48a and 49a formed respectively within the boss 48 and boss 49. These sockets are accurately machined and ground, and are preferably of a slightly larger radius than the ball ends of the struts. The reverse driving, spring toggle struts 52 comprise the two separate shank portions 52a and 52b having semispherical portions 52c and 52d at their outer ends. The two strut sections are both slidable along an axial pin 52e, the ends of which carry stop rings 52f which have snap engagement within annular grooves formed in the axial pin. These stop rings 52f play within outer counter-bores 52g in the two strut sections, thereby limiting the outward extensibility of the strut. A relatively heavy compression spring 52h encircles the strut and has its ends abutting the annular shoulders defined by the undersides of the semi-spherical end heads. The latter end heads have rockable bearing mounting within the spherical sockets 48b and 49b which are accurately machined and ground within the bosses 48 and 49 respectively.

There are preferably three such pairs of driving and spring struts 51 and 52 spaced equidistantly about the periphery of the shiftable clutch member 32 and thrust reaction member 42. Of course, any desired number of pairs may be employed, but three pairs afford a three point application of the spring pressure and also of the servo pressure. In this regard, my invention contemplates either a construction in which the shifting and rotating movement of the shiftable clutch member 32, incident to clutch engagement and release, occurs on a bearing surface afforded by the hub of the thrust reaction member 42, or other equivalent bearing surface, or, in the alternative, where this shifting and rotating movement occurs as a floating motion on the struts so that rocking, tilting, radial displacement or a veritable universal joint action is permitted for enabling most effective coaction between the driving and driven cones.

The helical angle of each strut is an angular inclination with respect to the axial line of the clutch. The forward driving struts 51 are all inclined at the same common angle with respect to this axial line, and the reverse driving spring struts 52 are all reversely or oppositely inclined at a same common angle with respect to this axial line. In the embodiments shown in Figures 3 and 4, this angular inclination is of substantially the same degree for both sets of struts, although the two sets may be disposed at considerably different angles, as will hereinafter appear. The degree of engaging pressure ultimately established in the clutch by the servo action of the struts can be proportioned as desired by varying the angular inclination of these struts. For example, as the angle of inclination of the struts 51 is made to approach the plane of rotation the servo action diminishes, and as the angle of inclination is made to approach the axial plane the servo action is increased.

Various types of clutch control mechanism may be employed, but I preferably utilize a ball-cam type of mechanism. One embodiment of the latter is illustrated in Figures 1, 5, 6, and 7, and comprises two circular cam plates 55 and 56 between which are disposed balls 57. As shown in Figures 6 and 7, the opposing faces of the two cam plates are formed with coacting runways 58 and 59 for each of the balls 57. As shown in Figure 1, this ball-cam mechanism is mounted over the crankshaft 25 at a point between the press clutch and the adjacent crankshaft bearing of the press frame. The two cam plates or rings 55, 56 are capable of relative rotation, and such relative rotation operates through the balls and sloping runways to create a spreading or separating pressure between the cam rings for holding the shiftable clutch element in its disengaged position. The cam ring 55 is capable of rotary movement but is fixed against axial shifting movement, whereas the cam ring 56 is capable of both rotary and shifting movement. The non-shiftable thrust ring 55 is mounted on a sleeve 61 which has an inner radial flange 62 against which the ring 55 is adapted to have thrust reaction. A snap type of confining ring 63 snaps into an annular groove in the sleeve 61 at the outer side of the cam ring 55 and prevents outward displacement thereof. The cam ring 55 can have its motion interrupted independently of continued forward motion of the crankshaft 25, as by continued motion of the crankshaft within the sleeve 61, or continued motion of the sleeve 61 within the cam ring 55, or both.

The shiftable cam ring 56 has pinned connection with the shiftable clutch element 32 through the dowel pins 65, thereby compelling a concurrent angular movement between the shiftable clutch element and the shiftable cam ring. A plurality of spacing shims 66 are interposed between the outer face of the cam ring 56 and the adjacent inner face of the shiftable clutch element 32, whereby the addition or removal of these shims effects a spacing adjustment for accommodating wear of the clutch lining 33.

Also mounted on the crankshaft 25 is the brake drum 68, the latter being rigidly secured to the shaft, as by the key 69. As shown in Figure 5, a brake or snubbing band 71 encircles this brake drum, the band having any suitable brake lining material 72 for engaging the drum. One end 73 of the brake band is rigidly anchored to any suitable fixed point of attachment 74, and the other end 75 of the band has a continuous spring tension acting thereon, through the medium of a plunger rod 76 on which a compression spring 77 acts, this plunger rod exerting a continuous tension tending to draw the band tightly about the drum. The direction of rotation is indicated by the arrow r, and the ends 73, 75 of the brake band are so related to this direction of rotation that normal forward motion in this direction tends to release the snubbing or braking action of the band, but motion in the reverse direction immediately receives the full force of the snubbing action for preventing such motion. This brake mechanism 68—71 is conventional apparatus in intermittently operating punch presses, and may be mounted on the opposite end of the crank shaft 25, instead of at the clutch end as shown.

The actual control of the clutch through the ball-cam mechanism 55—57 is effected by the operation of the releasable stop arm or sprag indicated at 81 in Figure 5. This stop member has any firmly supported pivotal mounting at its outer end, and is actuated vertically through the control yoke or link 83 which is pivotally connected to the stop member 81 by the pin 84. The nose 81' of this releasable stop is adapted to abut against a right-angle stop shoulder 85 which is formed in the non-shiftable cam plate 55. A gradual track or slope 86 leads inwardly from the periphery of the cam plate 55 to the bottom end of the stop shoulder 85.

In the normal disengaged condition of the clutch, the tripping mechanism 81—85 is in the position illustrated in Figure 5, the ball-cam mechanism 55—57 is approximately in the position illustrated in Figure 6, and the strut mechanism 51—52 is approximately in the position illustrated in Figure 8. In such condition of the strut mechanism, the three spring struts 52 all exert a spring pressure on the shiftable clutch element 32 tending to rotate it in the normal forward direction of rotation of the continuously rotating driving clutch element 31. This spring pressure also reacts through the driving struts 51 so as to tend to shift the shiftable clutch element toward the left into engaging position. This rotating shifting force thus continuously exerted by the spring struts on the shiftable clutch element is imparted directly to the shiftable cam ring 56, tending to move this cam ring axially and to the left, as illustrated in Figure 6. This holds the shallow end 59a of each cam runway 59 pressed up against the back of each associated ball 57, as shown in the latter figure. Correspondingly, the front side of each ball is held up against the shallow end 58a of each cam runway 58 in the non-shiftable cam ring 55. The engagement of each ball in the shallow ends of both cam pockets or runways 58—59 necessarily results in the maximum degree of separation or spread between the two rings 55—56, (Figure 6), this corresponding to the released condition of the shiftable clutch element 32. At this time, the engagement of the tripping stop 81 against the shoulder 85 of ring 55 prevents the latter ring from running ahead under the action of the rotating and axially shifting forces exerted through the balls 57. At this same time, the brake mechanism 68—71 is preventing the reaction pressure of the spring struts 52 from causing the thrust reaction member 42 and crankshaft 25 to revolve in a reverse direction and thereby effect engagement of the clutch.

Upon tripping the stop arm 81 out of engagement with the shoulder 85, the cam ring 55 is free to advance in the forward direction of clutch rotation, indicated by the arrow r in Figure 5. This cam ring is normally impelled in this direction by the above-described action of the balls 57 exerting a rotative force and a camming force against the bottoms of the cam pockets 58. Hence, the immediate angular shift of the cam ring 55 permits the balls 57 to run into the deep ends of the pockets or runways 58—59, thereby permitting the shiftable cam ring 56 to move axially toward the non-shiftable ring 55, as illustrated in Figure 7. This permits the axial displacement of the shiftable clutch element 32 into engagement with the continuously rotating driving clutch element 31 under the action of the spring struts 52, as indicated in Figure 9. The engagement of the clutch surfaces results in the entire torque load being transmitted through the forward driving struts 51, thereby causing these struts to act with a toggle servo motion for forcing the shiftable clutch element into engagement with the driving clutch element under extremely high engaging pressure.

Assuming that the punch press is to have an intermittent or one-cycle stop motion, the stop arm or dog 81 was released immediately after tripping so that this arm resumes contact with the periphery of the cam ring 55, whereby the shoulder 85 of said ring comes into abutment with said stop arm after the completion of one revolution of the crank shaft 25. Upon the abrupt stopping of the cam ring 55, its coacting shiftable cam ring 56 carries on ahead and thereby causes the balls 57 to be rolled up into the shallow ends of both coacting cam pockets 58, 59 finally coming into engagement with the relatively abrupt end shoulders or end stops 58a—59a. The resulting spreading force between the two cam rings thrusts the shiftable clutch element 32 back to its original disengaged position, this driven clutch element and the crank shaft coming to a relatively quick stop under the action of the continuously dragging brake band 71. This corresponds to a restored condition of the parts, in the same relation that they occupied at the start of the cycle. The cam pockets or runways 58—59 may be variously proportioned, but I prefer that the deep ends thereof shall not exceed half the diameter of the balls 57, and that the shallow ends 58a and 59a be sufficiently deep to function substantially as positive end stops adapted to coact with diametrically opposite sides of each ball 57 in such manner as to positively limit relative rotation between the cam rings 55—56 in one direction.

Figure 10 illustrates how the spring struts 52 can also function as reverse drive struts, this reverse drive being indicated by the arrow r'. It is frequently desirable to be able to back up the press ram during the operation of changing or setting the dies, and such can be readily accomplished in my improved construction by the action of the spring struts 52 contracting to a solid condition when the relative rotation between the members 32 and 42 is in a direction tending to compress each strut 52. At this time, the two shank portions of each spring strut come into end to end abutment as shown in Figure 10, with the result that the spring struts exert an outward toggle action for reverse drive substantially in the same manner that the other struts 51 exert an outward toggle action for forward drive. The spherical pockets for the ends of the forward driving struts 51 are sufficiently deep so that there is no possibility of the latter struts dropping out of these pockets during the reverse driving operation.

My improved strut mechanism automatically adapts itself to a relatively wide range of adjustment for accommodating different thicknesses of clutch lining, wear of the clutch lining, wear the parts, etc. For example, in Figure 11 I have illustrated how the forward driving struts 51 incline to a greater degree of angulation in accommodating wear of the clutch lining, following removal of one or more of the laminated shims 64. This figure illustrates the clutch engaged.

Figure 12:
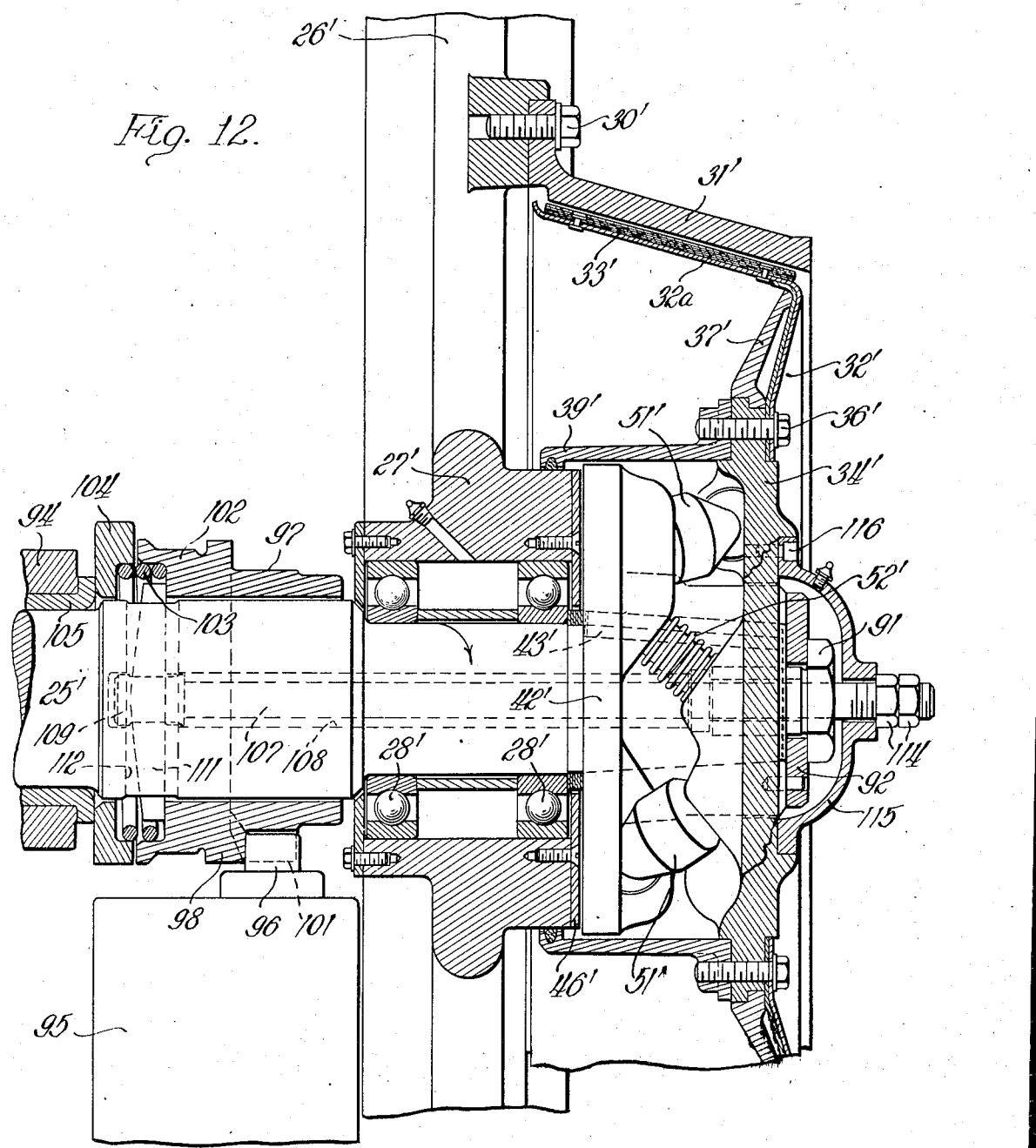
Figure 12 is a fragmentary axial sectional view through another embodiment of my improved clutch, different portions of the rotary member 42' being viewed on different section planes.

Figure 12 illustrates a modified construction in which the clutch parts are disposed on the outer side of the fly wheel or bull gear 26', and in which the clutch control mechanism is disposed on the inner side of said fly wheel or bull gear. Similar reference characters to those employed in Figure 1 will be used in this figure, except they will have a prime mark appended thereto.

The outer driving cone 31' is bolted to the web or spokes of the driving element 26' by the cap screws 30' to extend outwardly from the driving element, i. e., outwardly away from the frame of the punch press. The shiftable clutch element 32' includes the central hub structure 34' and the enclosing ring 39', corresponding, approximately, to the construction previously described. The thrust reaction member 42' has its hub fitted over the tapered outer end of the crank shaft 25', a driving key 43' being also interposed between said hub portion and the shaft. For holding the hub portion on the taper of the shaft, a retaining member 91 bears against the outer side of an end plate 92 which abuts against the outer end of the hub portion, the retaining member 91 comprising a threaded sleeve which screws into a tapped bore in the outer end of the shaft 25', and including a hexagonal head for screwing the threaded sleeve portion into the shaft. The forward driving solid struts 51' and the reverse driving spring struts 52' are arranged substantially as described in the case of the preceding embodiment. The functions and mode of operation of these struts are substantially the same as previously described.

The clutch control mechanism is interposed between the driving element 26' and the frame of the press, the frame being fragmentarily represented by the end bearing 94 for the crank shaft. A stationary bracket 95 carries a vertically retractible tripping latch 96 which is adapted to be tripped by the operator's control pedal or other control apparatus. This latch cooperates with a tripping collar or sleeve 97 which is splined or keyed to the shaft 25' so as to rotate therewith but to be capable of axial shifting movement thereon. The sleeve is formed with a tripping shoulder 98 which is normally pressed against the side of the latch 96, an inclined cam slope being formed on the sleeve in a direction leading up to the shoulder 98, whereby after retraction of the latch 96, the engagement of this cam slope with the side of the latch will cause the sleeve 97 to be shifted back to its normal inwardly disposed position at the completion of one revolution of the crank shaft, such one-cycle stop mechanism being well known in the art. Formed at the inner end of the sleeve 97 is an enlarged flange or housing portion 102 which confines one end of a relatively heavy compression spring 103. The other end of said spring extends into a recessed thrust ring 104 which abuts against the frame bearing 94, or against a bushing 105 mounted in said frame bearing. It will be noted that the action of the spring 103 is tending to shift the sleeve 97 toward the right, such occurring when the latch 96 is tripped. The motion of the sleeve 97 is transmitted to the shiftable clutch element 32' through a pull rod 107 which extends through a bore 108 formed axially within the shaft 25'. A head 109 on the inner end of said shaft has a narrow rectangular slot extending diametrically therethrough, and passing through this slot is a bar 111 which extends outwardly through a narrow slot 112 extending diametrically through the shaft and intersecting the bore 108. The ends of the bar 111 bear against the recessed inner end face of the tripping collar 97, whereby the axial shifting movement of said collar is transmitted through the bar 111 to the pull rod 107. The outer end of the rod is threaded to receiving adjusting nuts 114 which bear against an end cap 115 slidably mounted on the rod 107. This end cap is secured by screws 116 to the hub structure 34' of the shiftable clutch element 32'.

It will be seen from the foregoing that so long as the latch 96 is in engagement with the tripping shoulder 98 the pull rod 107 will remain in a retracted or inwardly pulled position, thereby holding the shiftable clutch element 32' out of clutch engaging position. Tripping of the latch 96 permits outward shifting movement of the collar or sleeve 97, thereby permitting outward movement of the pull rod 107, with the result that the shiftable clutch element moves into clutch engaging position. At the completion of one revolution, the tripping latch 96 having been previously released for restoration to normal position, the clutch is disengaged by the action of the cam slope on the sleeve 97 pressing against the latch 96 and causing the sleeve 97 to shift inwardly to its clutch releasing position. When the latch 96 returns to its normal position in front of the tripping shoulder 98 it also occupies a position in the path of an abutment shoulder or lug 101 formed on the sleeve 97, thereby preventing the possibility of the parts continuing rotation beyond the normal position after the clutch is disengaged. A typical brake band or snubbing band, similar to the band 71—71, is arranged to coact with a brake drum on the other end of the crank shaft in such relation as to prevent the crank shaft from backing up. As wear occurs in the clutch lining 33', the adjusting nuts 114 can be backed off on the end of pull rod 107, thereby adjusting the parts to this wear. The hub portion 34' of the shiftable clutch element may have slidable bearing support on the hub portion of the thrust reaction member 42', or it may be spaced laterally therefrom and from the pull rod 107 so that the shiftable clutch element is capable of a limited degree of floating motion on the struts, as described of the preceding embodiment.

Figures 13, 14 and 15 illustrate a clutch construction in which my improved strut mechanism is so arranged that the forward driving struts function primarily in the capacity of torque transmitting pivotal connections or pivotal keying elements intended to minimize friction between relatively shiftable elements of the clutch assembly rather than to create a servo pressure for assisting in clutch engagement. The controlled transmission of power to the cable winding winches of power shovels and the like is typical of situations where a large degree of servo action is sometimes not desirable, because it is frequently necessary in such power shovels that the operator be able to feel through the controls how heavy a load the clutch is pulling, such enabling him to tell when the dipper or shovel is striking a large rock or other obstruction which might result in breakage of the machine. Figures 13, 14 and 15 illustrate the above mentioned embodiment of my improved clutch in association with a cable winding winch or drum, but it will be understood that the clutch mechanism is not limited thereto but is also capable of use in many other similar situations. The various parts in this embodiment which correspond with parts in the first described embodiment have the same reference numerals applied thereto except that a double prime notation is appended to each numeral character.

The shaft 25" is in this instance a driving shaft receiving power from any suitable source of power supply. The winding drum 121 is shown as being mounted directly on this shaft for independent rotation. The clutch mounting end of the shaft 25" has any suitable bearing support in a conventional bearing standard 122, such as through the medium of the thrust resisting anti-friction bearing 123 which is confined within the bore of the bearing standard by the end cap 124. The clutch mechanism is confined between the winding drum 121 and this end bearing standard. In the present instance, the non-shiftable driving element of the clutch comprises the inner male cone 31" which has its hub portion secured to the shaft by the key 127. The axially shiftable driven clutch element comprises the outer female cone which carries the clutch lining 33". The central hub portion 34" of the shiftable clutch element is mounted on the outer race of a thrust transmitting anti-friction bearing 128 which has connection with the clutch operating mechanism, to be later described.

The driving struts 51" and the spring struts 52" are confined between the shiftable clutch element 32" and the thrust reaction member 42", this reaction member consisting, in this instance, of an end flange or some similar part on the winding drum 121. In the present embodiment, the struts are all disposed exteriorly of the shiftable clutch element, being mounted between the bosses 48" which project radially from the shiftable clutch element, and the bosses 49" which project laterally from the thrust reaction flange 42" of the winding drum. These bosses have spherical sockets formed therein for receiving the spherical end heads of the struts, substantially as described in connection with Figures 2, 3 and 4.

In the present instance, the spring struts 52" are inclined in such direction that their spring pressures tend to force the shiftable clutch element 32" into clutch disengaged position. The main torque transmitting struts 51" are inclined at a relatively small angle to the plane of rotation, or may be disposed substantially in the plane of rotation. For example, in Figure 14 these struts are shown as assuming the inclined positions represented by the full line x when the clutch is disengaged, and as assuming the non-inclined position indicated by the dotted line y when the clutch is engaged. Such latter position aligns each of these struts substantially parallel with the plane of rotation so that the struts are in a dead-center relation where they do not tend to transmit any servo action either for engaging or disengaging the clutch. In this relation, these struts function substantially entirely as a torque transmitting shiftable connection of minimum friction, but it will be understood that appropriate inclination may be given said struts for inward or outward shifting when it is desired that some servo action, either positive or negative, be inherent in the construction, as I shall hereinafter describe in connection with Figures 16 and 17. The inwardly shifted position of the clutch element 32", corresponding to the parallel position y of each driving strut, is indicated in Figure 14 by the dash and dot line Y. The arrow r in Figure 15 indicates the normal or forward direction of rotation when power is being transmitted to the drum for winding the cable. The spring struts 52" have the relatively movable shank portions which can abut and form a solid strut structure for reverse rotation, as described of the preceding embodiments.

I have illustrated a ball-cam type of mechanism for operating the above described clutch, but it will be understood that other types of operating mechanisms may be employed for imparting an inward shifting movement to the thrust bearing 128 when it is desired to engage the clutch. In the illustrated construction, the ball-cam mechanism comprises the two cam rings 155—156 between which are confined the balls 157. These balls are disposed in runways or half-pockets similar to the cam shaped runways or half-pockets 58 and 59 illustrated in Figures 6 and 7, whereby upon relative rotation between the rings 155 and 156 an axial separating or spreading force can be created therebetween. The outer ring 155 is anchored against rotation by the set screw 161 mounted in the bearing standard 122. The inner rotatable and shiftable ring 156 is mounted on a sleeve or bushing 162 on which is also mounted the inner race of the thrust bearing 128. An operating lever 163 is arranged to transmit rotation to the inner ring 156, as through the pin 164. The inner side of the lever hub may abut directly against the inner race of the thrust bearing 128, or an adjustment washer 165 may be interposed between these two elements for adjusting purposes. It will be undertsood that in the disengaged position of the clutch the balls 157 occupy positions in the deep ends of the associated cam pockets, and that when it is desired to engage the clutch, appropriate angular movement of the lever 163 actuates the cam ring 156 to carry the balls to the shallow ends of said pockets, thereby exerting a lateral spreading force between the two cam rings, which spreading force is transmitted through the thrust bearing 128 to the shiftable clutch element for forcing the latter into clutch engaging position.

Figures 16 and 17 show the struts 51" of Figures 13–15 arranged for creating either a positive or a negative servo action. In both figures the normal position of the struts, corresponding to a disengaged condition of the clutch, is represented by the full line position of the struts, aligned along the full line x, and the servo or actuated position of the struts, corresponding to an engaged condition of the clutch, is represented by the dotted line position of the struts, aligned along the dotted line y. In both figures, the dash and dot line z signifies a dead-center line where no shifting or servo action would occur. In Figure 16 the engaged position y of the strut is displaced to the right of the dead-center line z, and hence the thrust of the load tends to move the shiftable clutch element still further to the right, i. e., in the direction to create a positive servo action for increasing the clutch engaging pressure. In Figure 17, the engaged position of the strut is displaced to the left of the dead-center line z and hence the thrust of the load tends to move the shiftable clutch element still further to the left, i. e., in the direction to create a negative servo action for decreasing the clutch engaging pressure. In the latter construction, an increasing pressure would have to be exerted on the clutch through the medium of the control mechanism as the torque load increased. This arrangement might be advantageously employed in numerous situations where it would be desirable to have the clutch limit the torque that could be transmitted to a particular mechanism. It will be understood that the positive and negative servo angles may be greatly increased beyond the amount shown, if more pronounced servo action is desired.

It will be seen from the foregoing that my improved toggle strut servo mechanism has particular utility in combination with friction clutches on punch presses, for creating an extremely high engaging pressure between the clutch surfaces at the instant of impact of the die wtih the metal or other material being cut. The impact torque is the maximum torque transmitted to the press, and by having all of this torque act directly through the toggle struts, an extremely high servo pressure can be imparted to the clutch surfaces at the instant of impact. Because of the fact that there is no delay in the engagement of the clutch, the press can also be operated at a higher speed than with the conventional jaw or pin clutch.

My improved arrangement of struts is not limited in its utility to cone clutches, but has application to disk clutches and other clutches as well. Moreover, it may also be employed in brake mechanisms for forcing the two coacting brake surfaces together under servo action. Likewise, my improved clutch mechanism is not limited to punch press use nor winding drum use, but has application to other fields as well. When constructed in the embodiment of a cone clutch for a punch press, I find it preferable to employ a design of cone clutch in which the cone angle ranges from approximately 14 to 17 degrees on a side (28 to 34 degrees included angle) for maximum efficiency with modern high coefficient linings, although it will be understood that this particular proportion of cone taper is not essential.

While I have illustrated and described what I regard to be the preferred embodiments of my invention, nevertheless it will be understood that such are merely exemplary and that numerous modifications and rearrangements may be made therein without departing from the essence of the invention.

I claim:

1. In clutch mechanism of the class described, the combination of a shiftable clutch element, a rotary element, struts pivotally mounted between said elements and acting in compression to transmit substantially the entire clutch load from one element to the other, said struts accommodating shifting movement of the shiftable clutch element, and control means operative to exert a shifting force on said shiftable clutch element to release the clutch.

2. In clutch mechanism of the class described, the combination of a shiftable clutch element, a rotary element, toggle struts pivotally mounted between said elements to transmit in compression substantially the entire clutch load from one element to the other and reacting to said load by the exertion of a shifting force on said shiftable clutch element, and control means operative to effect axial clutch releasing movement of said shiftable clutch element.

3. In clutch mechanism of the class described, the combination of a shiftable clutch element, a rotary element, and servo strut members acting in compression to effect shifting movement of said shiftable clutch element in the same direction in response to relative rotation between said elements in either direction.

4. In clutch mechanism of the class described, the combination of a shiftable clutch element, a rotary element, and struts pivotally mounted between said elements and inclined at different angles to effect shifting movement of said shiftable clutch element in response to relative rotation between said elements in either direction.

5. In clutch mechanism of the class described, the combination of a shiftable clutch element, a rotary element driving struts pivotally mounted between said elements to transmit torque from one element to the other while accommodating shifting movement of said shiftable clutch element, and spring struts pivotally mounted between said elements comprising spring means tending to cause relative rotation between said elements.

6. In clutch mechanism of the class described, the combination of a shiftable clutch element, a rotary element, forward driving struts pivotally mounted between said elements to transmit torque from one element to the other during forward rotation, and reverse driving struts pivotally mounted between said elements to transmit torque from one element to the other during reverse rotation.

7. In clutch mechanism of the class described, the combination of a shiftable clutch element, a rotary element, a first set of struts pivotally mounted between said elements to transmit torque from one element to the other during one direction of rotation, and a second set of struts pivotally mounted between said elements and including spring means tending to cause relative rotation between said elements, this second set of struts operating to transmit torque from one element to the other during the opposite direction of rotation.

8. In clutch mechanism of the class described, the combination of a shiftable clutch element, a rotary element, and a plurality of struts pivotally mounted between said elements to accommodate relative shifting movement of said shiftable clutch element, each of said struts comprising separate end sections capable of relative axial movement, spring means tending to extend the struts by resiliently separating said end sections, and coacting stop surfaces associated with said end sections and adapted to abut and produce a solid strut when said end sections are moved toward each other.

9. In clutch mechanism of the class described, the combination of a shiftable clutch element, a rotary element, struts pivotally mounted between said elements to transmit substantially the entire clutch load from one element to the other and to accommodate shifting movement of the shiftable clutch element, and ball-cam mechanism for controlling the engaging and releasing of the clutch.

10. In clutch mechanism for transmitting continuous rotation from a driving element to a driven element, the combination of inner and outer clutch cones connected with said elements, said outer cone being shiftable, a rotary member associated with said outer cone, and struts pivotally connected between said outer cone and said rotary member for transmitting torque therebetween and for accommodating shifting movement of the outer cone, and clutch control mechanism for controlling the shifting of said outer cone.

11. In clutch mechanism of the class described, the combination of a shiftable clutch element, a rotary element, driving struts pivotally connected between said elements to transmit torque from one element to the other while accommodating shifting movement of said shiftable clutch element, and spring struts pivotally connected between said elements comprising spring means tending to shift said shiftable clutch element into clutch disengaging position.

12. In combination, two coacting friction elements one of which is adapted to have torque applied thereto, said elements being capable of relative rotation when separated and one of said elements being shiftable into and out of friction engagement with the other element, a thrust reaction element cooperating with said shiftable element, torque transmitting struts having pivotal mounting between said shiftable element and said thrust reaction element and accommodating shifting movement of said shiftable element, said struts acting in compression to transmit substantially all torque effective between said two latter elements and exerting a shifting force against said shiftable element in one direction, and control means operative to exert a shifting force against said shiftable element in the other direction.

13. In a punch press, the combination of a friction clutch comprising coacting driving and driven friction surfaces through which the driving torque is transmitted to the press, and toggle servo struts acting in compression in response to the impact torque of the press for applying engaging pressure to said surfaces.

14. In friction clutch mechanism of the class described, the combination of a pair of coacting friction clutch elements, one of which is shiftable, toggle strut means cooperating with said shiftable clutch element and acting in compression to exert an endwise thrust against said shiftable clutch element in a clutch engaging direction, whereby to create an engaging pressure between said elements which varies substantially proportionately with the torque transmitted through the clutch, and control means operative to separate said clutch elements in opposition to the endwise thrust of said toggle strut means.

15. In a clutch, the combination of a continuously rotating driving clutch element, a driven clutch element adapted to transmit rotation from said driving clutch element to the load, one of said clutch elements being shiftable into and out of engagement with the other clutch element, toggle strut servo mechanism arranged to bear substantially the entire torque load transmitted between said clutch elements and operative to exert a shifting force on said shiftable clutch element in one direction, and control means independent of said servo mechanism operative to exert shifting force on said shiftable clutch element in the other direction.

16. In a clutch, the combination of a continuously rotating driving clutch element, a driven clutch element adapted to transmit rotative movement from said driving clutch element to the load, said driven clutch element being shiftable into and out of clutching engagement with said driving clutch element, a thrust reaction member interposed between said driven clutch element and the load, toggle struts pivotally mounted between said driven clutch element and said thrust reaction member and acting in compression to transmit substantially the entire clutch load from said driven clutch element to said thrust reaction member, said toggle struts exerting a shifting force against said driven clutch element in a clutch engaging direction, and control means independent of said servo mechanism operative to exert a shifting force on said driven clutch element in a clutch releasing direction.

17. In a clutch, the combination of driving and driven clutch elements adapted to transmit rotative movement to the load to be driven, one of said clutch elements being shiftable into and out of clutching engagement with the other clutch element, a rotary element, servo strut means pivotally mounted between said shiftable clutch element and said rotary element and reacting to a torque load by the exertion of a shifting force on said shiftable clutch element, and clutch releasing means operative to exert a shifting force on said shiftable clutch element independently of and in opposition to the action of said servo strut means.

18. In a punch press, the combination of a friction clutch comprising coacting driving and driven friction surfaces through which the driving torque is transmitted to the press, each of said friction surfaces being rotatable in opposite directions, toggle servo struts acting in compression in response to the impact torque of the press for applying engaging pressure to said surfaces, and control means operative to separate said friction surfaces in opposition to the action of said toggle servo struts.

19. In a punch press, the combination of a friction clutch comprising coacting driving and driven clutch cones having cooperating friction surfaces through which the driving torque is transmitted to the press, said driven cone being shiftable into and out of engagement with said driving cone, toggle servo struts acting in compression in response to the impact torque of the press to transmit clutch engaging pressure to said shiftable clutch element, and control means operative to effect axial clutch releasing movement of said shiftable clutch element.

20. The combination with a clutch comprising driving and driven clutch elements adapted to transmit rotation to a rotary driven member, said driven clutch element being movable in its entirety relatively to said rotary driven member, of spring means adapted to have clutch actuating energy stored therein and operative to impart said energy as a rotative force tending to rotate said driven clutch element in one direction and said rotary driven member in the other direction, and one-cycle stop mechanism comprising a rotary control member coaxial of said driven clutch element and rotatable relatively thereto, said one-cycle stop mechanism governing the release of said spring means through said rotary control member.

21. The combination with a clutch comprising driving and driven clutch elements adapted to transmit rotation to a rotary driven member coaxial therewith, said driven clutch element and said rotary driven member being relatively rotatable about their common axis, of spring means adapted to have clutch engaging energy stored therein and operative to impart said energy as a rotative force tending to rotate said driven clutch element in one direction and said rotary driven member in the other direction, and control means normally tending to prevent rotation of said driven clutch element in said first direction and including brake drum and brake band means normally tending to prevent rotation of said rotary driven member in the latter direction.

22. The combination with a clutch comprising driving and driven clutch elements, of spring means adapted to impart rotative force to one of said clutch elements in a clutch actuating operation, and ball-cam mechanism governing said clutch actuating operation.

23. The combination with a clutch comprising driving and driven clutch elements, said driven clutch element being shiftable into and out of engagement with said driving clutch element, of spring means adapted to impart rotative force to said driven clutch element in a clutch actuating operation, and control means comprising a control member adapted to rotate with said driven clutch element but capable of having its rotation interrupted relatively thereto, said control means governing said clutch actuating operation.

24. The combination with a clutch comprising driving and driven clutch elements, of spring means for effecting initial engagement of the clutch, servo mechanism for thereafter causing a higher pressure of engagement of the clutch, and ball-cam mechanism controlling the operation of the clutch.

25. Clutch mechanism for a press or the like comprising driving and driven friction clutch elements, one of said elements being shiftable, spring means adapted to have clutch engaging energy stored therein and operative to impart said energy as a rotating force to said shiftable clutch element, toggle strut servo mechanism operating to convert said rotating force into a shifting force for moving said shiftable clutch element into engagement with its companion clutch element, and mechanism controlling the operation of the clutch comprising a ring having cam-shaped pockets therein and balls engaging in said pockets operative to create a shifting force for moving the shiftable clutch element out of engagement with the companion clutch element.

26. The combination with a clutch comprising driving and driven clutch elements, of spring means adapted to impart rotative force to one of said clutch elements in a clutch actuating operation, and control means governing said clutch actuating operation comprising a rotary control member operative to rotate with said latter clutch element but capable of having rotary motion relatively thereto.

27. In clutch mechanism for a punch press or the like, the combination of a friction clutch operatively connected to drive the press and comprising driving and driven clutch elements, spring means for effecting initial engagement of the clutch, servo mechanism comprising inclined toggle struts acting in compression to thereafter cause a higher pressure of engagement of the clutch under the impact torque of the press, and one-cycle stop mechanism for controlling the engaging and releasing of the clutch.

28. In a press of the class described, the combination of a crank shaft, a rotating driving member mounted for independent rotation on said shaft, a cone clutch comprising driving and driven cones, said driving cone being secured to said driving member, said driven cone being shiftable relatively thereto, a thrust reaction member associated with said shiftable driven cone and secured to said crank shaft, a plurality of inclined toggle struts pivotally connected between said shiftable clutch element and said thrust reaction member, said struts transmitting the entire torque load imparted to said crank shaft and reacting to said load by the exertion of a shifting force for increasing the pressure of engagement of said shiftable clutch element with said driving clutch element, and one-cycle stop mechanism for controlling the engaging and releasing of the clutch.

29. In clutch mechanism of the class described, the combination of a shiftable clutch element, a rotary element, toggle struts pivotally mouted between said elements to transmit substantially the entire clutch load from one element to the other and reacting to said load by the exertion of a shifting force on said shiftable clutch element, and one-cycle stop mechanism controlling the engaging and releasing of the clutch comprising a pair of rings having cam-shaped runways in their adjacent surfaces, balls disposed between said rings and engaging with said runways, one of said rings being rotatable and shiftable with said shiftable clutch element, the other of said rings being rotatable, and releasable means for controlling the rotation of one of said rings.

30. In clutch mechanism of the class described, the combination of a shiftable clutch element, a rotary element, a first set of struts pivotally mounted between said elements to transmit torque from one element to the other during one direction of rotation, a second set of struts pivotally mounted between said elements and including spring means tending to cause relative rotation between said elements, and one-cycle stop mechanism controlling the engaging and releasing of the clutch comprising a pair of rings having cam-shaped runways in their adjacent surfaces, balls disposed between said rings for engaging with said runways, one of said rings being rotatable and shiftable with said shiftable clutch element, the other of said rings being rotatable, releasable means controlling the rotation of one of said rings, and a brake band preventing reverse rotation of said shiftable clutch element.

31. In clutch mechanism of the class described, the combination of a shaft, a driving member rotatably mounted on said shaft, driving and driven clutch elements disposed to one side of said driving member and operative to connect the latter with said shaft, one of said clutch elements being shiftable, a thrust reaction element associated with said shiftable clutch element, a plurality of inclined toggle struts pivotally connected between said shiftable clutch element and said thrust reaction element, said struts transmitting substantially the entire torque load imparted to said shaft and reacting to said load by the exertion of a shifting force for increasing the pressure of engagement of said shiftable clutch element with its companion clutch element, and clutch operating mechanism associated with said shaft on the opposite side of said driving member from the clutch elements, said clutch operating mechanism comprising a tripping collar shiftable axially of said shaft, a tripping latch controlling the tripping movement of said collar, an operating rod extending through an axial bore in said shaft, means connecting said tripping collar with the inner end of said rod, and means connecting the outer end of said rod with said shiftable clutch element for imparting shifting movement thereto.

32. In clutch mechanism of the class described, the combination of a shiftable clutch element, a companion clutch element, said two clutch elements transmitting the entire rotary load of the clutch through their interengaging faces and each clutch element being freely rotatable in both directions, a rotary element, and struts pivotally mounted between said shiftable clutch element and said rotary element and acting in compression to transmit clutch engaging pressure to said shiftable clutch element, said struts accommodating shifting and lateral movements of said shiftable clutch element and affording a floating mounting of said shiftable clutch element relatively to its companion clutch element.

33. In clutch mechanism of the class described, the combination of a shiftable clutch element, a rotary element, and struts pivotally mounted between said elements and arranged to act in compression in the normal forward driving rotation of the clutch to create a negative servo force tending to move said shiftable clutch element to clutch disengaged position under the action of the torque transmited through the clutch.

34. In a clutch, the combination of cooperating driving and driven clutch elements, one of said clutch elements being controllable for engaging and releasing the clutch, toggle strut servo mechanism for actuating said controllable clutch element in one direction, and torque responsive mechanism for actuating said controllable clutch element in the other direction.

35. In a clutch, the combination of cooperating driving and driven clutch elements, one of said clutch elements being controllable for engaging and releasing the clutch, torque responsive servo mechanism for actuating said controllable clutch element in one direction, and ball-cam torque responsive mechanism for actuating said controllable clutch element in the other direction.

36. In a clutch for transmitting rotation to a rotary driven member, the combination of cooperating driving and driven clutch elements, said driven clutch element being shiftable into and out of clutching engagement with said driving clutch element, spring means for shifting said driven clutch element into clutching engagement, and ball-cam mechanism acting between rotary driven member and said driven clutch element for shifting said driven clutch element out of clutching engagement.

37. In a clutch, the combination of cooperating driving and driven friction clutch elements, said driven clutch element being shiftable into and out of clutching engagement with said driving clutch element, torque responsive servo mechanism for shifting said driven clutch element into clutching engagement with said driving clutch element, and ball-cam mechanism for shifting said driven clutch element out of clutching engagement with said driving clutch element, said ball-cam mechanism being arranged whereby it comes to rest along with said driven clutch element upon disengagement of the clutch independently of continued rotation of said driving clutch element.

38. In a clutch for transmitting rotation to a rotary driven member, the combination of a driving clutch element, a shiftable driven clutch element, spring means normally tending to shift said driven clutch element into clutching engagement with said driving clutch element, and servo-releasing mechanism comprising a cam slope and a rotary device rolling along said slope and acting between said rotary driven member and said driven clutch element for shifting said driven clutch element to a clutch releasing position, said servo releasing mechanism coming to rest with said rotary driven member when the clutch is released, independently of continued rotation of said driving clutch element.

39. In a clutch for transmitting rotation to a rotary driven member, the combination of a driving clutch element, a shiftable driven clutch element, spring means normally tending to shift said driven clutch element into clutching engagement with said driving clutch element, clutch releasing mechanism acting between said rotary driven member and said driven clutch element, said clutch releasing mechanism comprising a pair of thrusting members, one of which has inclined cam tracks, and rotary devices having rolling contact between said members and along said cam tracks for exerting a separating force between said thrusting members to shift said driven clutch element to clutch releasing position, said thrusting members and said rotary devices coming to rest with said rotary driven member when the clutch is released, independently of continued rotation of said driving clutch element, and one-cycle stop means acting on one of said thrusting members.

40. In a clutch for transmitting rotation to a rotary driven member, the combination of a driving clutch element, a shiftable driven clutch element, spring means normally tending to shift said driven clutch element into clutching engagement with said driving clutch element, clutch releasing mechanism acting between said rotary driven member and said driven clutch element, said clutch releasing mechanism comprising a thrusting member having an inclined cam track and a rotary device having rolling contact along said cam track for exerting a shifting force to shift said driven clutch element to clutch releasing position, and brake mechanism exerting a braking force on said rotary driven member.

CLARENCE M. EASON.